United States Patent
Heckschen et al.

(10) Patent No.: US 12,118,002 B2
(45) Date of Patent: Oct. 15, 2024

(54) DATA PROCESSING SYSTEM

(71) Applicant: ERNST & YOUNG GMBH, Stuttgart (DE)

(72) Inventors: Till Rainer Heckschen, Wuppertal (DE); Michael Wiese, Essen (DE)

(*) Notice: Subject to any disclaimer, the term of this patent is extended or adjusted under 35 U.S.C. 154(b) by 0 days.

(21) Appl. No.: 17/782,634

(22) PCT Filed: Dec. 4, 2020

(86) PCT No.: PCT/IB2020/061519
§ 371 (c)(1),
(2) Date: Jun. 3, 2022

(87) PCT Pub. No.: WO2021/111403
PCT Pub. Date: Jun. 10, 2021

(65) Prior Publication Data
US 2023/0010939 A1    Jan. 12, 2023

(30) Foreign Application Priority Data
Dec. 6, 2019 (GB) ................................. 1917877

(51) Int. Cl.
G06F 17/00 (2019.01)
G06F 16/2455 (2019.01)

(52) U.S. Cl.
CPC ............................. *G06F 16/24553* (2019.01)

(58) Field of Classification Search
CPC . G06F 16/24553; G06F 16/367; G06Q 40/00; G06Q 40/12; G06N 20/00
See application file for complete search history.

(56) References Cited

U.S. PATENT DOCUMENTS

| | | | | |
|---|---|---|---|---|
| 6,094,660 A | * | 7/2000 | Glitho | H04W 24/00 |
| 11,676,134 B2 | * | 6/2023 | Daly | G06Q 20/38 |
| | | | | 705/35 |
| 11,687,827 B2 | * | 6/2023 | Pondicherry Murugappan | |
| | | | | G06Q 10/10 |
| | | | | 706/11 |

(Continued)

OTHER PUBLICATIONS

Peter Christen, Ross W. Gayler, Khoi-Nguyen Tran, Jeffrey Fisher, and Dinusha Vatsalan. Automatic Discovery of Abnormal Values in Large Textual Databases, J. Data and Information Quality, 7, 1-2, Article 7, 31 pages.< https://doi.org/10.1145/2889311>, Jun. (Year: 2016).*

(Continued)

*Primary Examiner* — Greta L Robinson
(74) *Attorney, Agent, or Firm* — RC Trademark Company (57) ABSTRACT

Disclosed is a data processing system comprising a database arrangement and at least one processor coupled in communication with the database arrangement. The at least one processor is configured to obtain, from the database arrangement, labelled training data; process 5 the labelled training data using at least one machine learning algorithm to generate a data processing model; obtain, from the database arrangement or a user device, at least one test document; process the at least one test document using the data processing model to extract key information from the at least one test document; and compare the 10 extracted key information with reference key information to identify whether or not there exist inconsistencies between the extracted key information and the reference key information.

8 Claims, 6 Drawing Sheets

(56) References Cited

U.S. PATENT DOCUMENTS

2009/0222490 A1\* 9/2009 Kemp .................. G06F 16/93
2017/0192940 A1 7/2017 Ghatage et al.
2019/0108418 A1\* 4/2019 Coven ................ H04N 21/4788

OTHER PUBLICATIONS

International Search Report and Written Opinion of the International Searching Authority issued in International Patent Application No. PCT/IB2020/061519 on Apr. 1, 2022, 11 pages.
Notification Concerning Transmittal of International Preliminary Report on Patentability issued in International Patent Application No. PCT/IB2020/061519 on Jun. 16, 2022, 16 pages.

\* cited by examiner

| V1 | V2 | V3 | V4 | % |
|---|---|---|---|---|
| N11 | N21 | N31 | N41 | 75 |
| N12 | N22 | N32 | N42 | 100 |
| N13 | N23 | N33 | N43 | 100 |
| N14 | N24 | N34 | N44 | 100 |
| N15 | N25 | N35 | N45 | 75 |

Download Table

Previous | 1 | Next

Upload target training document
Browse | File1
Upload complete

Select training document
Browse | 50 files
Upload complete

Train data processing module

Reference key information
Browse
Upload complete

Test documents
Browse
Upload complete

Execute testing

DATA PROCESSING SYSTEM

TECHNICAL FIELD

The present disclosure relates generally to data processing; and more specifically, to data processing systems comprising database arrangements and processors.

BACKGROUND

In recent times, advancements in technology have led to a change in the way business is conducted as well as how business data is accumulated and analyzed. Notably, the business data generated from business operations is increasing day-by-day. Moreover, the business data exists in several formats including, but not limited to, text formats, image formats and audio formats. Nowadays, data repositories are used to store comprehensive business data, and data processing is employed to extract valuable information from said business data. During such processing of data, multiple data elements (for example, text documents, image files, and the like) are compared with each other to identify anomalies that exist in the business data.

Typically, the processing of data is carried out manually by a user, wherein the user compares information in multiple data elements to identify anomalies therebetween. However, evaluating large number of data elements is a cumbersome task. Therefore, the user generally evaluates only a limited number of data elements, which makes the analysis prone to errors. For example, auditors evaluate large amount of financial data (such as invoices or similar documents) manually. In such a case, the auditors draw a sample of documents and manually inspect each sampled document. The auditors only evaluate the sample of financial documents as it is not feasible to evaluate the entire financial data. Upon such inspection, the auditors identify differences between the sampled financial documents and financial data declared by a client in his/her database. Manually evaluating the sampled financial documents and comparing them to the financial data declared by the client is a time-consuming task for the auditors. The auditors perform the aforesaid evaluation manually, based on their judgment. This often leads to errors and inaccuracies in the auditing process and a low quality of audit evidence.

Nowadays, automation is increasingly being used to reduce the manual effort expended in data processing. In an automated system, a computer is trained to access the data elements and process them in a similar manner to that of the user. To execute the aforesaid process, training data has to be preprocessed and fed to the computer. However, a lot of manual effort is required for such preprocessing. Thus, using the automated system still requires considerable human effort. In other words, existing (semi-) automated systems are sub-optimal and non-efficient.

Therefore, in light of the foregoing discussion, there exists a need to overcome the aforementioned drawbacks associated with processing a large amount of data and identifying inconsistencies therein.

SUMMARY

The present disclosure seeks to provide a data processing system. The present disclosure seeks to provide a solution to the existing problem of processing a large amount of data and identifying inconsistencies therein. An aim of the present disclosure is to provide a solution that overcomes at least partially the problems encountered in prior art, and provides an efficient, user-friendly and easy to implement data processing system that processes a large amount of data and identifies anomalies that exist in the data within a reasonable amount of time.

In one aspect, an embodiment of the present disclosure provides a data processing system comprising:
   a database arrangement; and
   at least one processor coupled in communication with the database arrangement, wherein the at least one processor is configured to:
      obtain, from the database arrangement, labelled training data;
      process the labelled training data using at least one machine learning algorithm to generate a data processing model;
      obtain, from the database arrangement or a user device, at least one test document;
      process the at least one test document using the data processing model to extract key information from the at least one test document; and
      compare the extracted key information with reference key information to identify whether or not there exist inconsistencies between the extracted key information and the reference key information.

Embodiments of the present disclosure substantially eliminate or at least partially address the aforementioned problems in the prior art and enable a time efficient training of data processing model to provide an efficient, user-friendly and easy to implement data processing system that processes a large amount of data and identify anomalies that exist in the data.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a data processing system comprising:
 a database arrangement; and
 at least one processor coupled in communication with the database arrangement, wherein the at least one processor is configured to:
  obtain, from the database arrangement, labelled training data;
  process the labelled training data using at least one machine learning algorithm to generate a data processing model;
  obtain, from the database arrangement or a user device, at least one test document;
  process the at least one test document using the data processing model to extract key information from the at least one test document; and
  compare the extracted key information with reference key information to identify whether or not there exist inconsistencies between the extracted key information and the reference key information.

The present disclosure provides the aforementioned data processing system for processing a large amount of data and identifying anomalies that exist in the data, within a reasonable amount of time. The data processing model is trained by employing a single training target document that includes annotated required outputs for the plurality of training documents. The training of the data processing model is executed by simply processing the single training target document and the plurality of training documents. Therefore, the data processing model is trained efficiently with minimal to no preprocessing. Notably, the data processing system is efficient as it trains the data processing model in less time. In the aforesaid data processing system, minimal manual effort is required to train the data. Notably, a cost spent for training the data processing model is low. The data processing system is user-friendly and easy to implement. The aforesaid data processing system supports a data-driven decision making by providing fact-based evidence.

Throughout the present disclosure, the term "data processing system" refers to a specialized system that is configured to process documents to identify whether or not there exist discrepancies between data extracted from such documents and reference data pertaining to such documents.

Throughout the present disclosure, the term "database arrangement" refers to hardware, software, firmware, or a combination of these for storing information in an organized (namely, structured) manner, thereby, allowing for easy storage, access (namely, retrieval), updating and analysis of such information.

Throughout the present disclosure, the term "processor" refers to hardware, software, firmware or a combination of these. The at least one processor controls operation of the data processing system. It will be appreciated that the term "at least one processor" refers to "one processor" in some implementations, and "a plurality of processors" in other implementations.

The at least one processor is coupled in communication with the database arrangement.

In an embodiment, the at least one processor is physically coupled to the database arrangement. In such a case, there exists both a physical coupling (for example, via wires) that acts a communicative coupling between the at least one processor and the database arrangement. Optionally, the at least one processor and the database arrangement are implemented on a single device. Examples of such a device include, but are not limited to, a personal computer, a tablet, and a smartphone.

In another embodiment, the at least one processor is physically remote from the database arrangement. In such a case, there exists a wireless communicative coupling between the at least one processor and the database arrangement. Furthermore, optionally, the at least one processor and the database arrangement are implemented on separate devices. Optionally, the at least one processor is wirelessly coupled to the database arrangement via a wireless communication network.

The labelled training data is obtained by the at least one processor, from the database arrangement.

Optionally, the at least one processor is configured to provide a user with an interactive user interface to enable the user to select the labelled training data. Optionally, the interactive user interface is provided at the user device, wherein the user device is coupled in communication with the database arrangement.

As an example, the user may browse all documents stored in the database arrangement to select the labelled training data. In such a case, the user may select the labelled training data by uploading the labelled training data to the at least one processor.

Throughout the present disclosure, the term "user device" refers to a device that allows the user to interact with the data processing system. The database arrangement could be coupled in communication with a plurality of user devices associated with a plurality of users. Examples of the user device include, but are not limited to, a mobile phone, a smart telephone, a Mobile Internet Device (MID), a tablet computer, an Ultra-Mobile Personal Computer (UMPC), a phablet computer, a Personal Digital Assistant (PDA), a web pad, a Personal Computer (PC), a handheld PC, a laptop computer, a tablet computer, and a desktop computer.

Throughout the present disclosure, the term "interactive user interface" refers to a space that allows for interaction between the user and the data processing system. Therefore, the term "interactive user interface" can also be understood to be a "human-machine interface". The interactive user interface is generally rendered on a display screen of the user device and allows the data processing system to receive input(s) from the user and to provide output(s) to the user.

Throughout the present disclosure, the term "labelled training data" refers to data that is employed for training the data processing model, said data comprising input and output data elements that are associated to each other by way of labels. It will be appreciated that the labelled training data allows for supervised learning of the data processing model. The at least one processor utilizes the labelled training data to train the data processing model for subsequently analyzing newly-fed data into the data processing system. In other words, the labelled training data enables the data processing system to intelligently process the newly-fed data.

Optionally, the labelled training data comprises a plurality of training documents and a training target document, the training target document comprising labelled key information extracted from the plurality of training documents.

Throughout the present disclosure, the term "training document" refers to an input data element that is employed for training the data processing model, whereas the term "training target document" refers to an output data element that is employed for training the data processing model.

Optionally, a number of the plurality of training documents ranges from 20 training documents to 1000000000 training documents. It will be appreciated that the number of the plurality of training documents is only limited by processing power of the at least one processor (of the data processing system). The number of the plurality of training documents could optionally also be greater than 1000000000. As an example, 400 training documents may be used as input data elements for training the data processing model. As another example, 50000 training documents may be used as input data elements for training the data processing model.

Optionally, a format in which the plurality of training documents and the training target document are available is one of: a text format, an image format, a video format, an audio format. Examples of a suitable format include, a Portable Document Format (PDF), a Tag image bitmap file (TIFF) format, a Portable Network Graphics (PNG) format, a Joint Photographic Experts Group (JPEG) format, Microsoft Excel Open XML Format Spreadsheet File (XLSX) format, a Comma-Separated Values (CSV) format, and the like.

Optionally, the training target document comprises a list of the labelled key information, said list comprising the key information extracted from the plurality of training documents and a label indicating corresponding training documents of the key information. More optionally, in the target training document, one key information is mapped to one training document.

Optionally, a given key information corresponding to a given training document comprises at least one of: data values associated with variables in the given training document, keywords of the given training document, a summary of the given training document.

It will be appreciated that the at least one processor is capable of accurately mapping each training document to its corresponding line in the single training target document. The corresponding line of a given training document includes key information associated with the given training document. When this labelled training data is preprocessed to train the data processing model, the at least one processor is required to simply process the plurality of training documents and the single training target document. A significant advantage of preprocessing such labelled training data to train the data processing model is that it eliminates a requirement of providing separate training target documents comprising separate key information for each training document. As the key information for all training documents of the plurality of training documents is collated in the single training target document, the aforesaid preprocessing is fast and computationally-efficient.

The labelled training data is processed, by the at least one processor, using the at least one machine learning algorithm to generate the data processing model. The preprocessing of labelled training data is performed by the at least one processor to understand mapping between the plurality of training documents and their corresponding key information in the training target document of the labelled training data via at least one machine learning algorithm. As a result, the at least one processor learns a relationship between the plurality of training documents and their corresponding key information, via supervised learning. The data processing model is generated based upon a function that the at least one processor infers upon the aforesaid learning, said function pertaining to how key information is to be extracted from a given document.

Throughout the present disclosure, the term "machine learning algorithm" refers to an algorithm that allows the at least one processor to deduce relationships between the plurality of training documents and their corresponding key information, and subsequently learn to process new documents based on the deduced relationships.

Optionally, the at least one machine learning algorithm comprises at least one of: a decision tree-based algorithm, a gradient boosting algorithm, a neural network-based supervised learning algorithm. Examples of the decision tree-based algorithm include but are not limited to a XGBoost (XGB) algorithm, and a Random Forest (RF) algorithm.

Throughout the present disclosure, the term "data processing model" refers to a model that is trained using the labelled training data, to process at least one given document based on such training. The data processing model extracts key information from the at least one given document by utilizing the function that the at least one processor infers upon the aforesaid training.

The at least one test document is obtained by the at least one processor from either the database arrangement or the user device. Optionally, the at least one processor is configured to enable, via the interactive user interface, the user to select the at least one test document.

As an example, the user may browse all documents stored in the database arrangement or the user device to select the at least one test document. In such a case, the user may select the at least one test document by uploading the at least one test document to the at least one processor.

Throughout the present disclosure, the term "test document" refers to a at least one new document from which key information is to be extracted using the data processing system. Notably, the at least one test document is provided as an input to the data processing model. It will be appreciated that the at least one test document is different from the plurality of training documents in the sense that the at least one test document has not been processed by the at least one processor earlier, as opposed to the plurality of training documents which are optionally used as a part of the labelled training data to train the data processing model.

Furthermore, it will also be appreciated that a format in which the at least one test document is available may or may not be same as the format in which the plurality of training documents and the training target document are available.

The at least one test document is processed using the data processing model to extract the key information from the at least one test document. Optionally, when extracting the key information from the at least one test document, the data processing model employs the function that the at least one processor infers upon processing the labelled training data. It will be appreciated that by extracting the key information from the at least one test document, the data processing model intelligently predicts key information associated with the at least one test document.

It will be appreciated that a nature of the key information extracted by the data processing model from the at least one test document is similar to a nature of the labelled key information (in the training target document) that was used to train the data processing model. For example, the labelled key information may comprise data values associated with a variable X in the plurality of training documents. In such a case, the key information extracted by the data processing model from the at least one test document would also comprise data values associated with the variable X.

Throughout the present disclosure, the term "reference key information" refers to a list with provided key information associated with the at least one test document.

The extracted key information from the at least one test document is compared by the at least one processor with the reference key information of the same at least one test document to identify whether or not there exist inconsistencies between the extracted key information and the reference key information of the at least one test document. The inconsistencies, if any, between the extracted key information and the reference key information renders a measure of incorrectness (namely, misstatements) in any or both of the extracted key information and the reference key information.

In an embodiment, the inconsistencies between the extracted key information and the reference key information are introduced on account of errors in the extracted key information. In such a case, the extracted key information may be inaccurate due to less-than-perfect training of the data processing model.

In another embodiment, the inconsistencies between the extracted key information and the reference key information are introduced on account of errors in the reference key information. In such a case, the reference key information may be incorrectly posted (for example, by an entity) for the at least one test document.

In yet another embodiment, the inconsistencies between the extracted key information and the reference key information are introduced on account of errors in the extracted key information and the reference key information.

As an example, the inconsistencies between the extracted key information and the reference key information of the at least one test document may be a variation in the data values of the variables, a variation in the keywords of the at least one test document, and/or a variation in the summary of the at least one test document.

Optionally, the at least one processor is further configured to represent, via the interactive user interface, a summary of the comparison between the extracted key information and the reference key information.

Optionally, the summary of the comparison between the extracted key information and the reference key information is indicative of a percentage degree of similarity between the extracted key information and the reference key information. Optionally, the at least one processor is further configured to enable, via the interactive user interface, a user to select and view the at least one test document in order to identify where the inconsistencies occur. Optionally, the summary of the said comparison is rendered on the interactive user interface in the form of at least one of: a text, an image, a video, an audio, a graphical representation. Examples of the graphical representation include, but are not limited to, a histogram, a bar graph, a sunburst chart, a pie chart, and a tabular data.

Optionally, the at least one test document comprises a plurality of test documents, and the at least one processor is configured to employ parallel processing for processing the plurality of test documents using the data processing model. In such a case, the plurality of test documents is processed simultaneously by the at least one processor, wherein the data processing model extracts key information from the plurality of test documents at the same time. The extracted key information from the plurality of test documents is then parallelly compared to reference key information of the plurality of test documents. Therefore, the plurality of test documents can be processed at once to improve the efficiency of the data processing system. Moreover, such parallel processing consumes less time, reduces processing cost and optimally utilizes the computing capabilities of the at least one processor. It will be appreciated that when a given processor is a single-core processor, two or more single-core processors are utilized to perform the aforesaid parallel processing.

Alternatively, when a given processor is a multi-core processor (for example, such as a dual-core processor, a quad-core processor, an octa-core processor, and the like), one or more multi-core processors are utilized to perform the aforesaid parallel processing.

Optionally, the labelled training data comprises labelled financial data, the at least one test document comprises at least one financial document, the extracted key information comprises financial data extracted from the at least one financial document, and the reference key information comprises reference financial data posted by an entity to be audited in a general ledger or a sub-ledger of the entity. Notably, the data processing system compares the financial data extracted from the at least one financial document with the reference financial data to identify whether or not there exist inconsistencies between the extracted financial data and the reference financial data. In such a case, existence of inconsistencies is indicative of financial misstatements. It will be appreciated that the data processing system can be efficiently used to handle large volumes of financial documents pertaining to the entity for purpose of conducting an audit of the entity. Notably, audit evidence obtained by using the data processing system is well-structured and accurate.

Throughout the present disclosure, the term "entity" refers to an individual, a group of individuals, an organization, a group of organizations, and the like.

Optionally, the labelled financial data comprises a plurality of financial training documents and a financial training target document, the financial training target document comprising labelled financial key information extracted from the plurality of financial training documents. A given financial training document may be, for example, an invoice, an income receipt, a wage payment receipt, a donation receipt, a purchase order, a delivery note or a similar financial document. Likewise, a given financial training target document may be, for example, a document comprising a list of the financial key information extracted from the given financial training document. The financial key information may be, for example, a data value of a total amount of an invoice, a date of an invoice, an invoice number, a user identification (ID), an order ID, and the like.

Optionally, at least the labelled financial data and the reference financial data posted by the entity are provided in a general ledger and/or a subledger associated with the entity. Herein, the term "general ledger" refers to a master set of accounts maintained by the entity, wherein details of all financial transactions that are undertaken by the entity are recorded. The general ledger contains entries for all debit transactions as well as entries for credit transactions of the entity. Examples of a given account recorded in the general ledger include, but are not limited to an account receivable, an account payable, a cash management account, a bank management account, a purchase account, a production cost account, a payroll account, and a fixed asset account. Notably, the term "subsidiary ledger or subledger" is a subset of the general ledger. Because it is not reasonable to record all the financial transactions in the general ledger, transactions of different categories are recorded in different subledgers (corresponding to different accounts) and a total sum of said transactions is reflected in the general ledger.

DETAILED DESCRIPTION OF THE DRAWINGS

Figure 1:
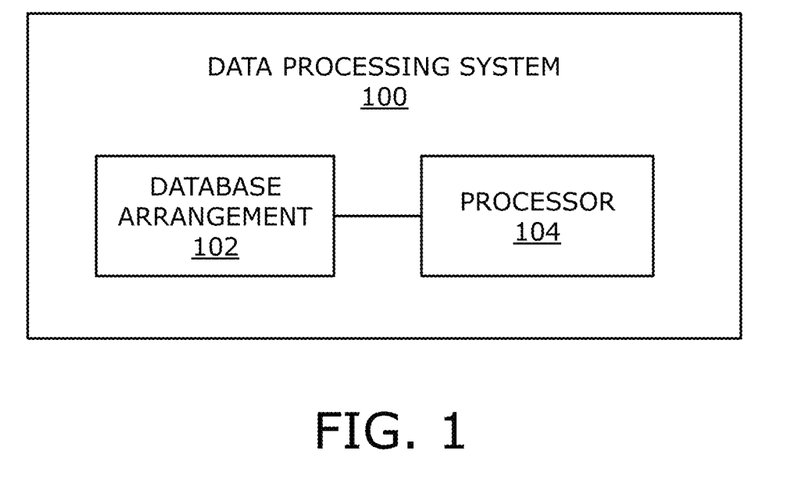
FIG. 1 illustrates a block diagram of a data processing system, in accordance with an embodiment of the present disclosure.

Referring to FIG. 1, illustrated is a block diagram of a data processing system 100, in accordance with an embodiment of the present disclosure. The data processing system 100 comprises a database arrangement 102 and at least one processor (depicted as a processor 104) coupled in communication with the database arrangement 102.

Figure 2:
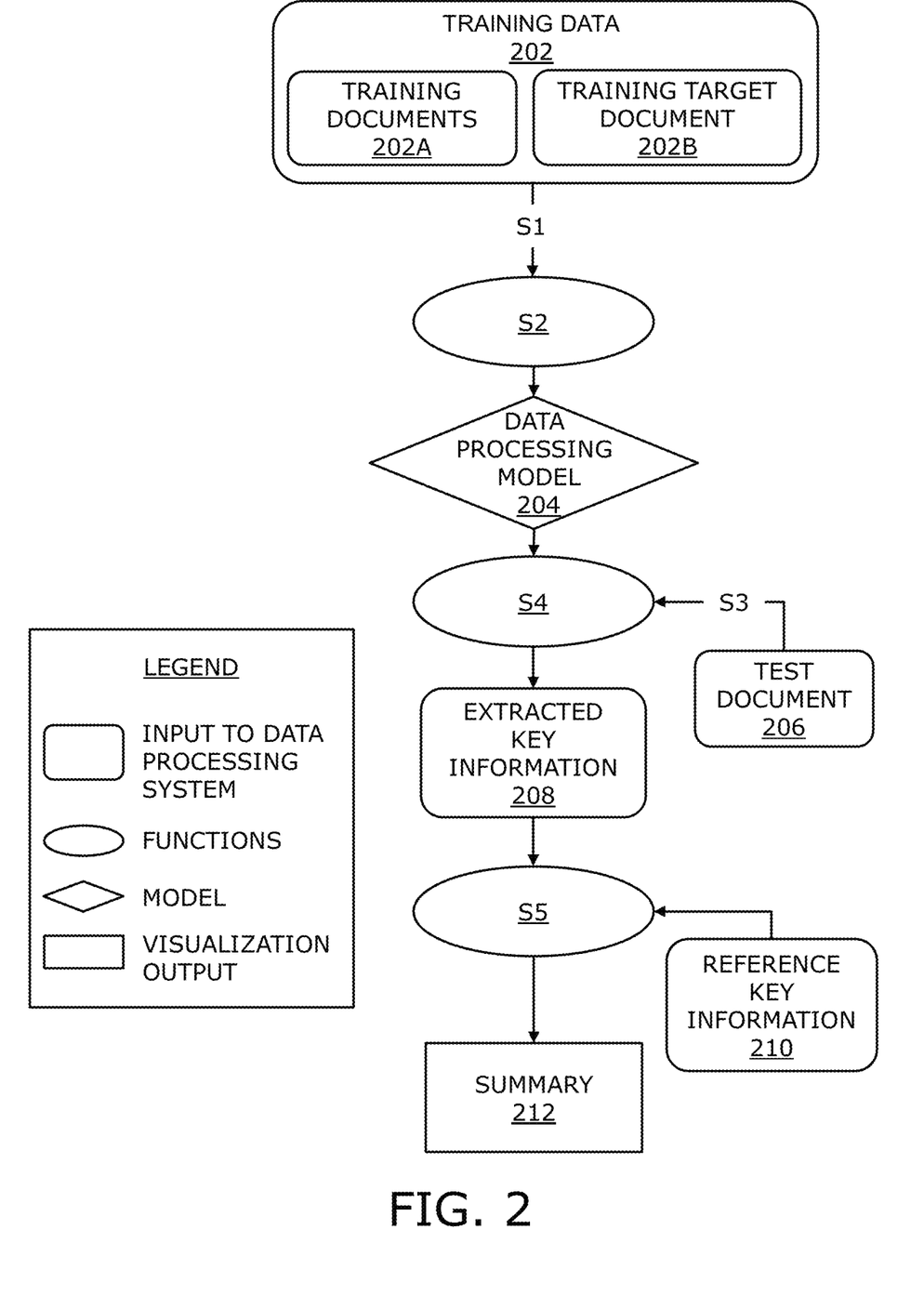
FIG. 2 illustrates a process flow diagram of a data processing system, in accordance with an embodiment of the present disclosure.

Referring to FIG. 2, illustrated is a process flow diagram of a data processing system, in accordance with an embodiment of the present disclosure. The data processing system comprises a database arrangement and at least one processor coupled in communication with the database arrangement.

The at least one processor obtains, from the database arrangement, labelled training data 202. The labelled training data 202 comprises a plurality of training documents 202A and a training target document 202B, the training target document 202B comprising labelled key information extracted from the plurality of training documents 202A. The step of obtaining the labelled training data 202 is depicted as step S1. Thereafter, the at least one processor, at step S2, processes the labelled training data 202 using at least one machine learning algorithm to generate a data processing model 204. At step S3, the at least one processor obtains, from the database arrangement or a user device, at least one test document 206. At step S4, the at least one processor processes the at least one test document 206 using the data processing model 204 to extract key information 208 from the at least one test document 206. Thereafter, at step S5, the at least one processor compares the extracted key information 208 with reference key information 210 to identify whether or not there exist inconsistencies between the extracted key information 208 and the reference key information 210. The at least one processor is optionally further configured to represent a summary 212 of the comparison between the extracted key information 208 and the reference key information 210.

Referring to FIGS. 3A-3D, illustrated are exemplary views of an interactive user interface 300 to be presented to a user of a data processing system, in accordance with an embodiment of the present disclosure.

Figure 3A:
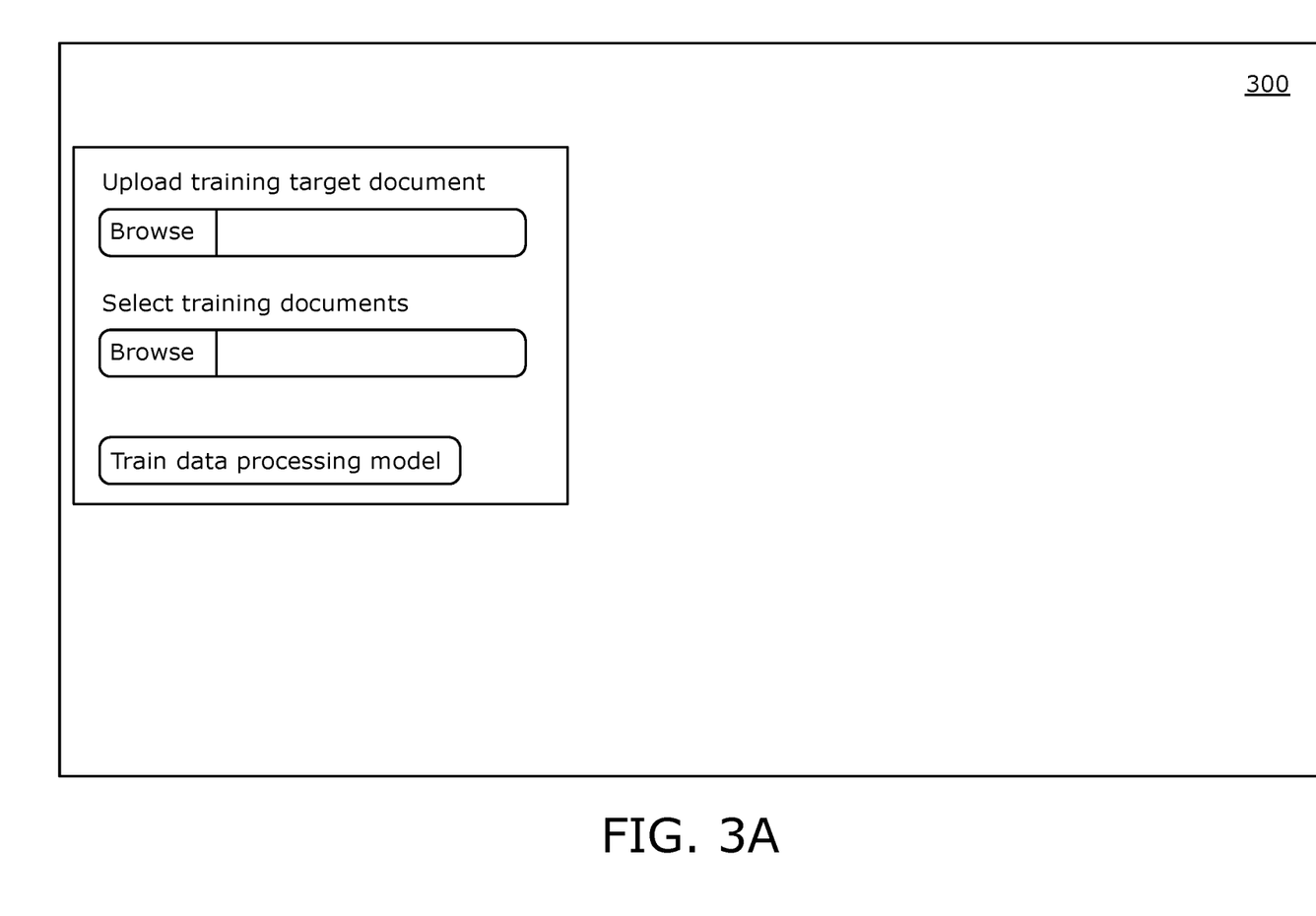
FIGS. 3A-3D illustrate exemplary views of an interactive user interface to be presented to a user of a data processing system, in accordance with an embodiment of the present disclosure.

In FIG. 3A, the interactive user interface 300 enables the user to select labelled training data. The labelled training data comprises a training target document and a plurality of training documents. The user selects the training target document and the plurality of training documents by clicking on respective 'Browse' buttons on the interactive user interface 300. When the user clicks on 'Train data processing model' button, at least one processor of the data processing system processes the labelled training data using at least one machine learning algorithm to generate a data processing model.

Figure 3B:
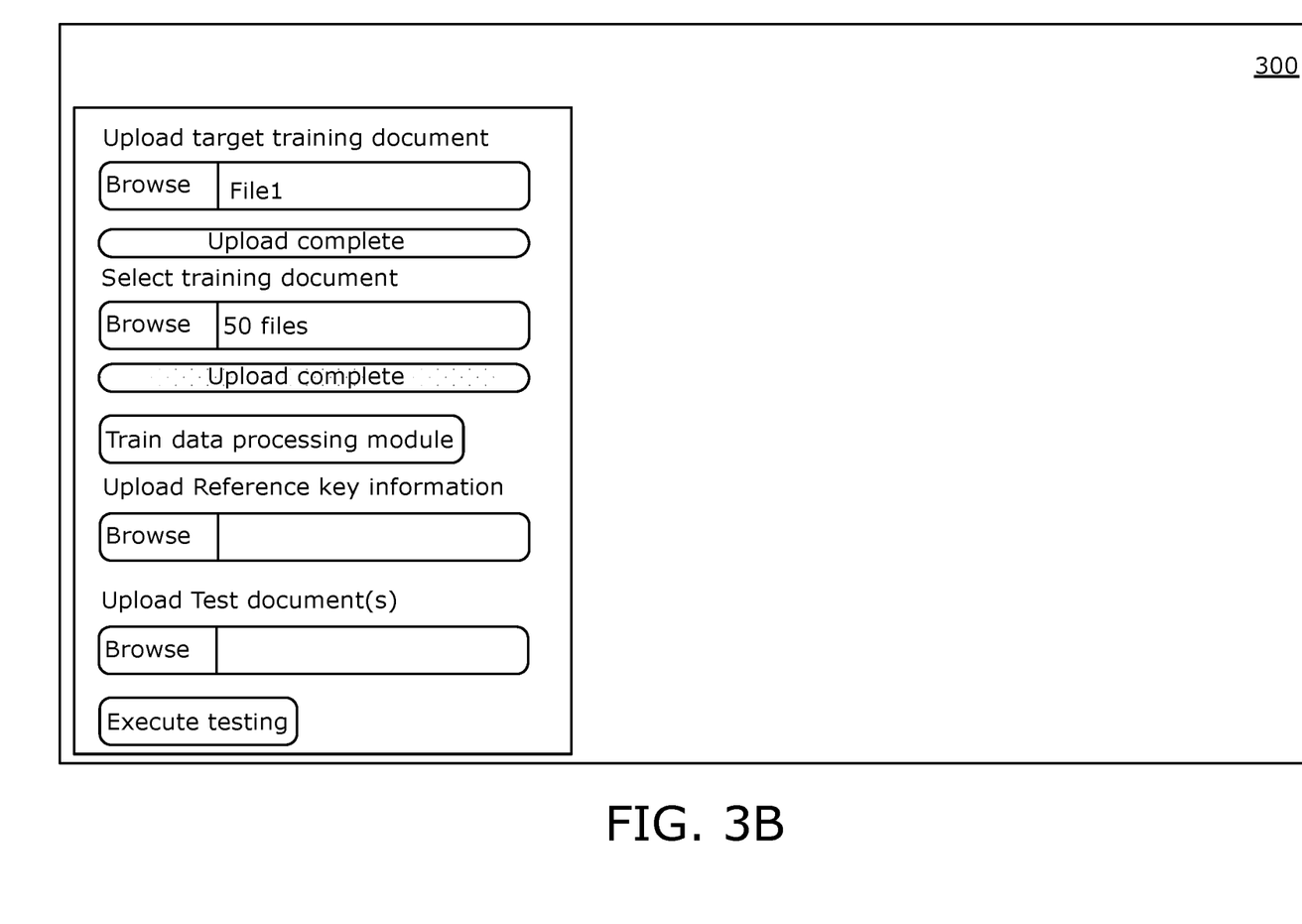

In FIG. 3B, the interactive user interface 300 enables the user to select at least one test document by clicking on a corresponding 'Browse' button. The interactive user interface 300 further enables the user to select a document comprising reference key information by clicking on a corresponding 'Browse' button. When the user clicks on 'Execute testing' button, the at least one processor processes the at least one test document using the data processing model to extract key information from the at least one test document, and compares the extracted key information with the reference key information to identify whether or not there exist inconsistencies between the extracted key information and the reference key information.

Figure 3C:
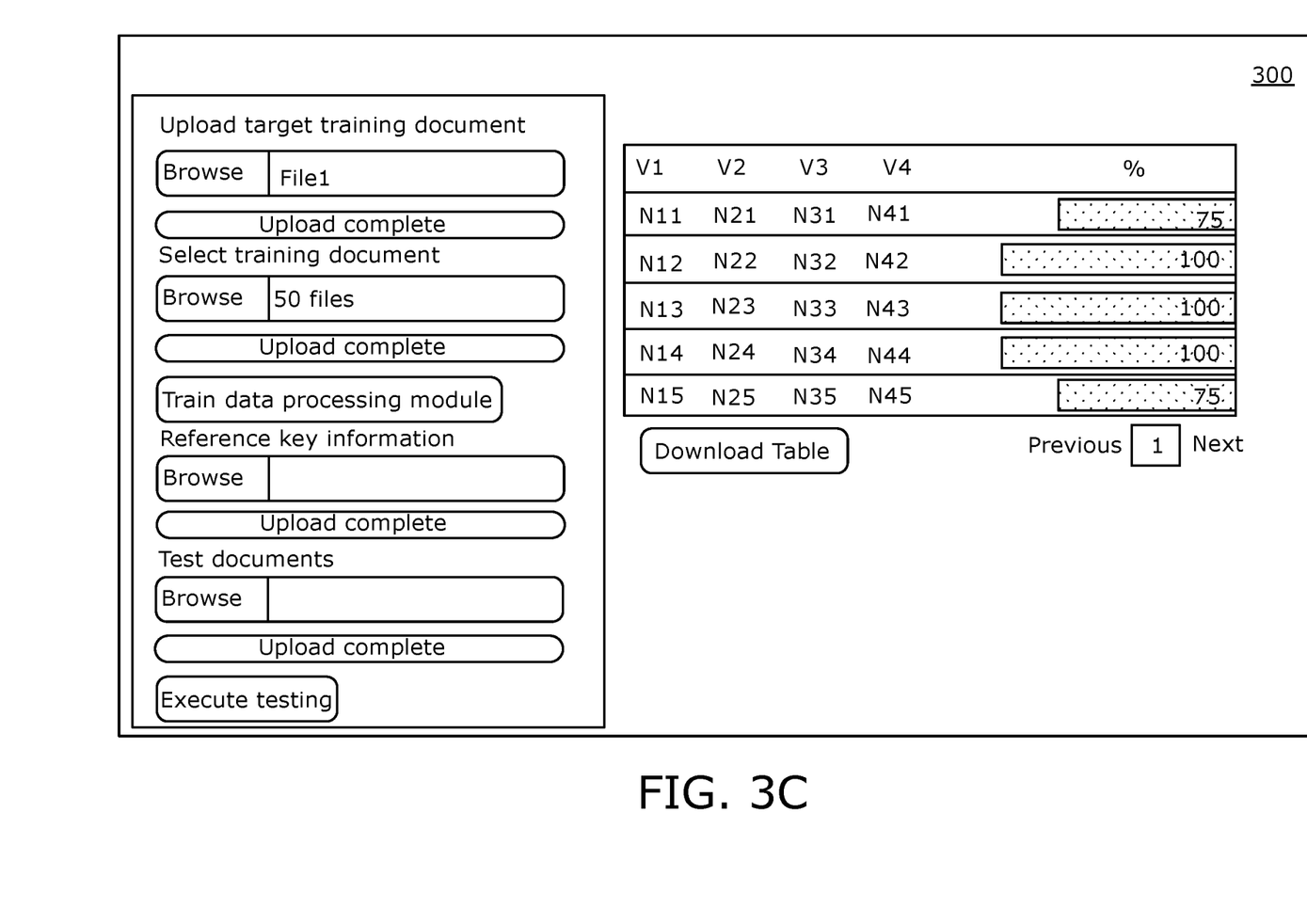

In FIG. 3C, the interactive user interface 300 represents a summary of the comparison between the extracted key information and the reference key information. As shown, the summary is presented in a tabular form wherein four columns of the table correspond to data values of variables V1, V2, V3 and V4 of the at least one test document and a last column '%' corresponds to a percentage degree of similarity between the extracted key information and the reference key information. For example, extracted data values of the variables V1-V4 for a test document corresponding to a first row of the table are 75% similar to data values of the variables V1-V4 in the reference key information, extracted data values of the variables V1-V4 for a test document corresponding to a second row of the table are 100% similar to data values of the variables V1-V4 in the reference key information, and so forth.

Figure 3D:
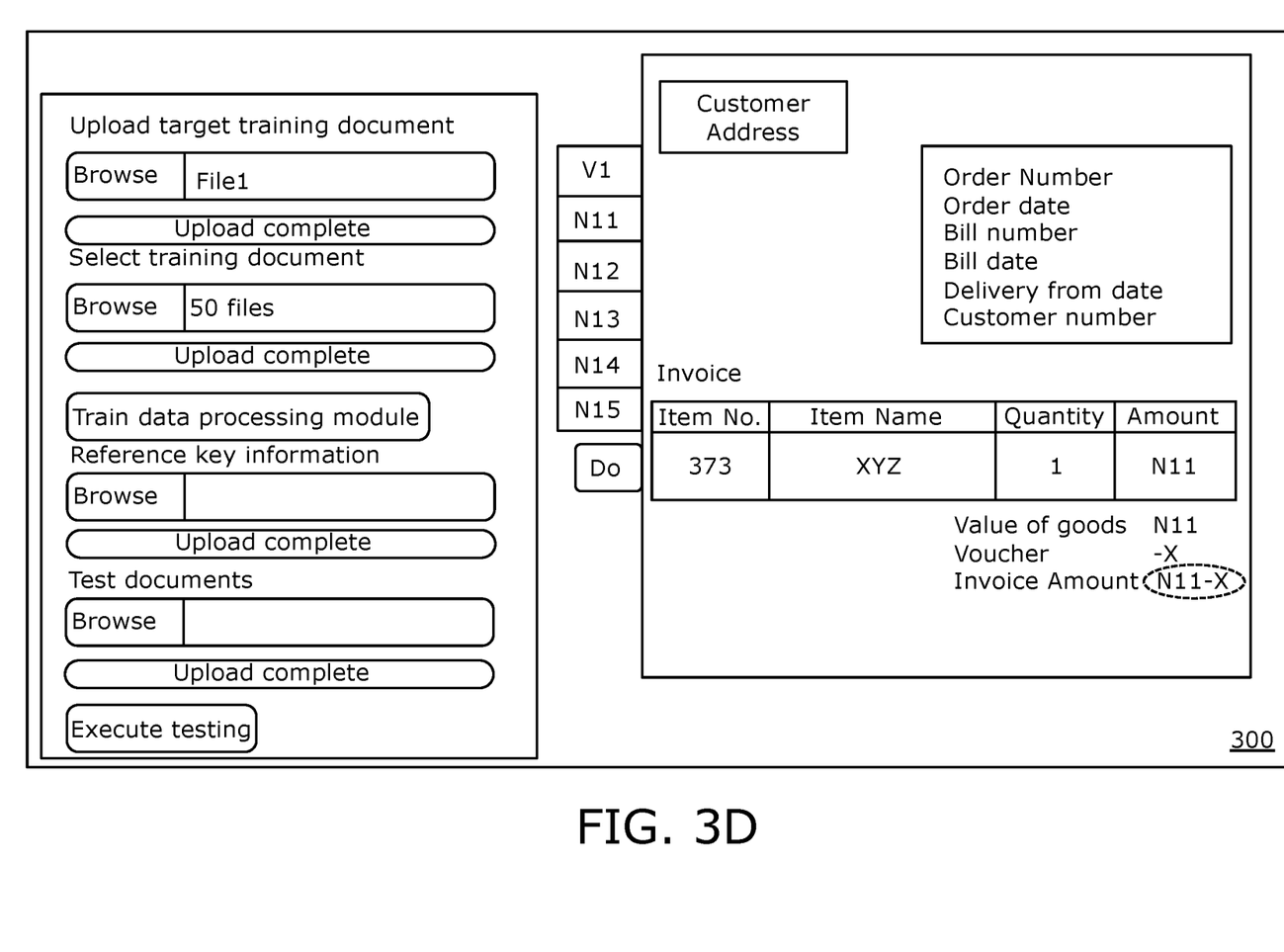

In FIG. 3D, the interactive user interface 300 enables the user to view the at least one test document. The user optionally views test document(s) for which the extracted key information and the reference key information are inconsistent (namely, having less than 100% similarity). For example, the user views the test document corresponding to the first row of the table. Notably, extracted data value N11 of the variable V1 for said test document is inconsistent with data value N11-X of the variable V1 in the reference key information, the variable V1 being 'Invoice amount'. When the user views said test document, he/she understands that the inconsistency is that the extracted data value N11 corresponds to Value of goods before applying any voucher, whereas the data value N11-X corresponds to Invoice amount after applying a discount voucher.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A data processing system comprising:
   a database arrangement; and
   at least one processor coupled in communication with the database arrangement, wherein the at least one processor is configured to:
   obtain, from the database arrangement, labelled training data;
   process the labelled training data using at least one machine learning algorithm to generate a data processing model;
   obtain, from the database arrangement or a user device, at least one test document;
   process the at least one test document using the data processing model to extract key information from the at least one test document; and
   compare the extracted key information with reference key information to identify if inconsistencies exist between the extracted key information and the reference key information, wherein the at least one processor is further configured to represent, via an interactive user interface, a summary of the comparison between the extracted key information and the reference key information, and wherein the summary is indicative of a percentage degree of similarity between the extracted key information and the reference key information.

2. The data processing system of claim 1, wherein the labelled training data comprises a plurality of training documents and a training target document, the training target document comprising labelled key information extracted from the plurality of training documents.

3. The data processing system of claim 2, wherein the at least one machine learning algorithm comprises at least one of: a decision tree-based algorithm, a gradient boosting algorithm, a neural network-based supervised learning algorithm.

4. The data processing system of claim 3, wherein the at least one test document comprises a plurality of test documents, and the at least one processor is configured to employ parallel processing for processing the plurality of test documents using the data processing model.

5. The data processing system of claim 1, wherein the at least one test document comprises a plurality of test documents, and the at least one processor is configured to employ parallel processing for processing the plurality of test documents using the data processing model.

6. The data processing system of claim 5, wherein the labelled training data comprises labelled financial data, the at least one test document comprises at least one financial document, the extracted key information comprises financial data extracted from the at least one financial document, and the reference key information comprises reference financial data posted by an entity to be audited in a general ledger or a sub-ledger of the entity.

7. The data processing system of claim 1, wherein the at least one machine learning algorithm comprises at least one of: a decision tree-based algorithm, a gradient boosting algorithm, a neural network-based supervised learning algorithm.

8. The data processing system of claim 1, wherein the labelled training data comprises labelled financial data, the at least one test document comprises at least one financial document, the extracted key information comprises financial data extracted from the at least one financial document, and the reference key information comprises reference financial data posted by an entity to be audited in a general ledger or a sub-ledger of the entity.

* * * * *